United States Patent [19]
Farrow et al.

[11] Patent Number: 6,166,332
[45] Date of Patent: Dec. 26, 2000

[54] METHOD AND APPARATUS FOR CONTROLLING THE BEND IN A RIBBON CABLE

[75] Inventors: Timothy S. Farrow; Tze-wing Keung, both of Apex; Joel E. Walker, Raleigh, all of N.C.

[73] Assignee: International Business Machines Corporation, Armonk, N.Y.

[21] Appl. No.: 09/196,577

[22] Filed: Nov. 20, 1998

[51] Int. Cl.[7] ........................................................ H01B 7/18
[52] U.S. Cl. .................... 174/135; 174/72 C; 174/72 TR
[58] Field of Search ................................ 174/72 TR, 135, 174/136, 138 R, 138 E, 117 F, 117 FF, 70 A, 70 C, 70 R, 71 R, 72 C, 72 R

[56] References Cited

U.S. PATENT DOCUMENTS

| | | | |
|---|---|---|---|
| 5,937,745 | 8/1999 | Boe | 174/72 TR |
| 5,951,322 | 9/1999 | Nishikigi | 439/456 |

*Primary Examiner*—Kristine Kincaid
*Assistant Examiner*—Adolfo Nino
*Attorney, Agent, or Firm*—George E. Grosser

[57] ABSTRACT

A method and apparatus for securing a ribbon cable in a bent position with the extent of the bend limited to prevent distortion of or damage to the cable. The cable clamp apparatus includes a first and a second member, an inner member positioned inside the bend and an outer member located outside the bend of the ribbon cable, with one of the two members including at least one latch for securing the other member in a fixed relationship while the ribbon cable remains bent but at no greater a bend than the minimum radius. The latch is preferably formed integrally with the outer member, projecting each end at a distance approximately equal to the length of the inner member to hold the inner member in releasable relationship to the outer member while limiting the bend of the ribbon cable to the diameter of the inner member to avoid damage to the cable. One embodiment of the design of the inner member and the complementary outer member includes both concave radiused portions and convex radiused portions to define a serpentine path there between for the ribbon cable.

18 Claims, 3 Drawing Sheets

METHOD AND APPARATUS FOR CONTROLLING THE BEND IN A RIBBON CABLE

FIELD OF THE INVENTION

The present invention relates to improvements in the use of ribbon cable. More particularly, the present invention relates to a method and apparatus for bending ribbon cables while keeping the bend from interfering with the electrical conduction of the cable.

BACKGROUND OF THE INVENTION

Many ribbon cables are used in electronic assemblies (such as computers) to carry electrical signals from one component to another. Such ribbon cables usually include a plurality of electrical conductors positioned adjacent one another in a flat arrangement.

Many uses of such ribbon cables require the ribbon cable to make turns, sometimes in different planes. These turns tend to bend the ribbon cable, sometimes at sharp angles such as 90 or 180 degrees, such as folding the ribbon cable over onto itself to reverse direction. Such sharp angle bends sometimes damage or distort the ribbon cable, leading to problems with conductivity in the cable, sometimes providing intermittent conductivity, where sometimes a signal on a given conductor within the cable will fail and other times the signal on the same conductor will pass through properly.

Such failure in the conductor causes problems in a computer in that the signal indicates some data that is not moved from one component (a floppy disk drive, for example) to the next (the processor on the mother board, for example). This corruption of data is unacceptable in a personal computer, because the data is lost and because intermittent problems are difficult to locate and remove. For example, if the data from the floppy disk drive is not received at the processor, or is only sometimes received, is it the floppy disk drive that has failed, the processor, the mother board or the ribbon cable?

Applicants have recognized that as frequencies have increased data errors have increased. By rounding the bends in ribbon cables the number of errors is reduced. Applicants provide a rounded surface that locks the cable to provide compact and easily formed ribbon cable bends that do not breakdown easily into an unmanageable tangle.

Accordingly, the prior art ribbon assemblies have undesirable shortcomings and limitations.

SUMMARY OF THE INVENTION

The present invention overcomes the limitations and disadvantages of the prior art ribbon cable routing systems.

The present invention is a method and cable clamping apparatus for routing ribbon cables through a bend with a minimum of damage or distortion to the cable by controlling the radius of the bend in the ribbon cable.

Controlling the bending of the ribbon cable to a minimum diameter by a two-piece assembly that is secured to the ribbon cable provides an easy, simple and inexpensive way of controlling the bending of the ribbon cable and minimizes the likelihood that the ribbon cable will be damaged or that the signal transmission characteristics of the cable will be altered at the location of the bend.

Minimizing the damage to the ribbon cable at the location of a sharp bend prolongs the life of the ribbon cable and reduces the necessity to replace the ribbon cable or the component to which the ribbon is attached.

The cable clamp assembly of the present invention includes two members, one member including a latch on its ends to secure the other member in a releasable position with respect to the other member. The latch in the one member is preferred formed integrally with that one member to avoid extra parts and the attendant extra manufacturing and inventory cost.

The foregoing and other advantages and object of the present invention will be apparent to those skilled in the art in view of the following description of the preferred embodiment, taken together with the accompanying drawings and the appended claims.

DETAILED DESCRIPTION OF THE PREFERRED EMBODIMENT

Figure 1:
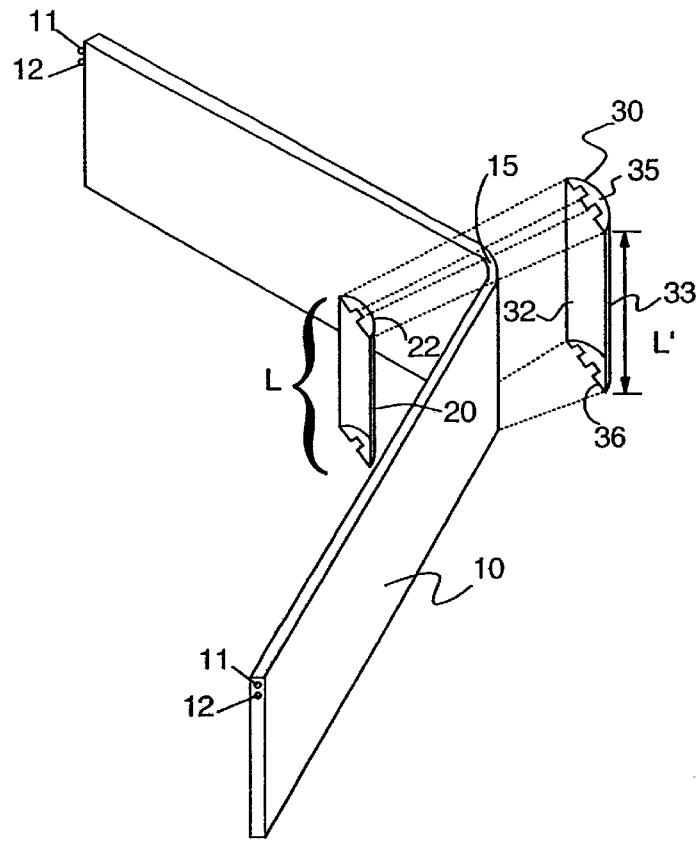
FIG. 1 is an exploded isometric view of a ribbon cable with a cable clamp assembly of the present invention.

FIG. 1 is an exploded isometric view of a ribbon cable 10 and cable clamp assembly pieces 20, 30 positioned around a bend 15 in the ribbon cable 10. The ribbon cable 10 includes a plurality of conductors 11, 12 which extend the length of the cable, the number of which depends on the application, but could range from a few conductors to sixty conductors or more. This ribbon cable 10 is of conventional design and available from a variety of vendors and is used in electronic equipment (such as computers, circuit boards and microprocessors) to carry electrical signals from one component to another (such as from storage media to a mother board in a personal computer). The width of the ribbon cable 10 is a function primarily of the number and size of the conductors employed in the ribbon cable and the length depends on the distance between the components being connected and intervening obstacles which the cable must avoid such as heat sources or fan blades. The individual conductors 11, 12 are separated from each other by insulation to isolate the electrical signals.

The cable clamp assembly includes the inner member 20 which is positioned on the inside of the bend 15 of the ribbon cable 10 and the outer member 30 which is positioned on the outside of the bend 15.

Since a sharp bend has been found to cause damage to the conductors 11, 12 of the ribbon cable 10, it is desirable to maintain a minimum diameter in the bends of the ribbon cable 10. This is accomplished by forming the inner member 20 to have an arcuate outer surface 22 positioned adjacent the ribbon cable 10, the arcuate external surface having an outside diameter of at least the minimum functional bend diameter of the cable. The inner member 20 is depicted with its external surface which is substantially semi-cylindrical; while the inside surface of the inner member 20 is shown as complementary and hollowed-out substantial semi-cylinder, the inner member could be a complete semi-cylinder or a cylindrical piece, if desired, and still achieve the advantages of the present invention in securing the ribbon cable 10 bent with a controlled minimum radius. The inner member 20 has a length L which is just slightly longer than the width of the ribbon cable 10 where it is crossed by the inner member 20 to extend slightly beyond the ribbon cable 10 when the ribbon cable 10 is bent over the inner member 20.

The outer member 30 serves as a retainer or cap for the inner member 20 and includes an arcuate recess 32 formed in the shape of a semi-cylindrical cavity by a curved wall portion 33 and top and bottom end portions 35, 36. The length L' of the outer member 30 between its end portions 35, 36 is slightly longer than the length L of the inner member 20 so that the inner member 20 with the ribbon cable 10 over it fits within the outer member 30.

Figure 2:
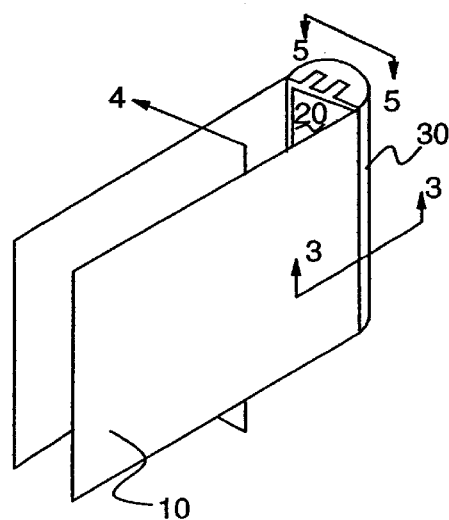
FIG. 2 is a perspective view of the two pieces of the cable clamp assembly of the present invention with the ribbon cable positioned between them.

FIG. 2 is a perspective view of the assembled ribbon cable 10 and cable clamp assembly 20, 30. The cable clamp assembly 20, 30 is positioned at a 90 degree angle with respect to the ribbon cable 10 to provide an effective 180 degree change in the direction of the ribbon cable 10, e.g., to direct the far end of the ribbon cable 10 in generally the same orientation as the near end, but in the opposite direction.

Figure 3:
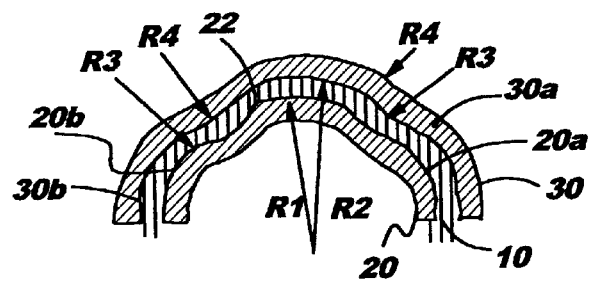
FIG. 3 is an enlarged cross-sectional view of a portion of the cable clamp assembly of FIG. 2, taken along the line 3—3 in FIG. 2, looking in the direction of the arrows.

FIG. 3 illustrates the controlled bend of the ribbon cable 10 in an enlarged cross-sectional view taken along the lines 3—3 in FIG. 2, looking in the direction of the arrows. Rather than the bend of the ribbon cable 10 being a crease with a right angle or other sharp bend with a low radius of curvature which could damage the conductors 11, 12 inside the ribbon cable 10, as the ribbon cable 10 might do if no control were applied, the ribbon cable 10 has a minimum diameter provided by the arcuate outer surface 22 of the inner member 20. The inner member 20 has an external concave surface which is adjacent to the ribbon cable 10 and has a radius RI of 6.35 mm in its preferred embodiment. The outer member 30 has an internal surface which is adjacent the ribbon cable 10 with a radius R2 of 7.55 mm (to allow a spacing of approximately 1.2 mm between the surfaces, slightly greater than the thickness of the ribbon cable 10). The Inner member 20 also has two convex radiused portions 20a, 20b which have a radius of 6.35 mm while the outer member 30 has two complementary radiused portions 30a, 30b each with a radius of 5.15 mm positioned adjacent to the convex radiused portions 20a, 20b. This creates a serpentine or undulating region between the inner member 20 and the outer member 30 for the ribbon cable 10 to better retain it there between.

Figure 4:
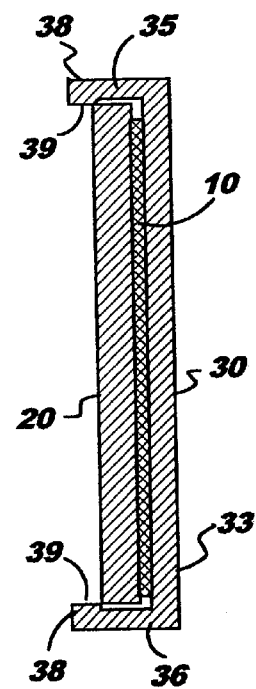
FIG. 4 is an enlarged cross-sectional view of a portion of the cable clamp assembly of FIG. 2, taken along the line 4—4 in FIG. 2, looking in the direction of the arrows.

FIG. 4 illustrates a securing system between the inner member 20 and the outer member 30 of the present invention. The outer member 30 includes the top end portion 35 and the bottom end portion 36 which extend substantially perpendicular from the curved wall portion 33 to define substantially semicircular end portions of a cylinder (a semicylindrical shape if the convex radiused portion defining the serpentine shape of the members is disregarded), similar in shape to a vertically-sliced half of soda can (only much smaller).

The inner member 20 and the outer member 30 are each formed as a single unitary piece by injection molding of plastic (preferably polycarbonate) material. This allows the latch 38 to be movable and, with the distance between the two inward projections 39 on the outer member being slightly smaller than the length L of the inner member 20, allows the inner member 20 to push the latches 38 with their inward projections 39 open slightly during assembly of the inner member 20 into the outer member 30, then to retain the inner member 20 until at least one of the latches 38 and its inward projection 39 are moved outward to release the retention of the inner member 20 within the outer member 30.

Figure 5:
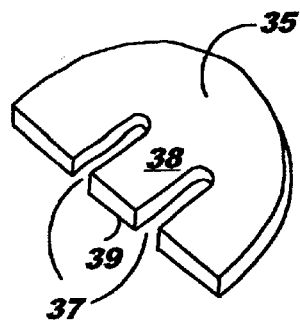
FIG. 5 is an enlarged view of an end portion of the cable clamp assembly of FIG. 2, taken along the line 5—5 in FIG. 2, looking in the direction of the arrows.

FIG. 5 is an enlarged view of the end 35 of the member 30, looking along line 5—5 in the direction of the arrows. Two cuts 37 in the top end portion 35 define a latch 38 there between, with the latch 38 being formed with an inward projection 39. The bottom end portion 36 has similar cuts including an inward projection to form a latch in this portion with this latch also including an inward projection.

Figure 6:
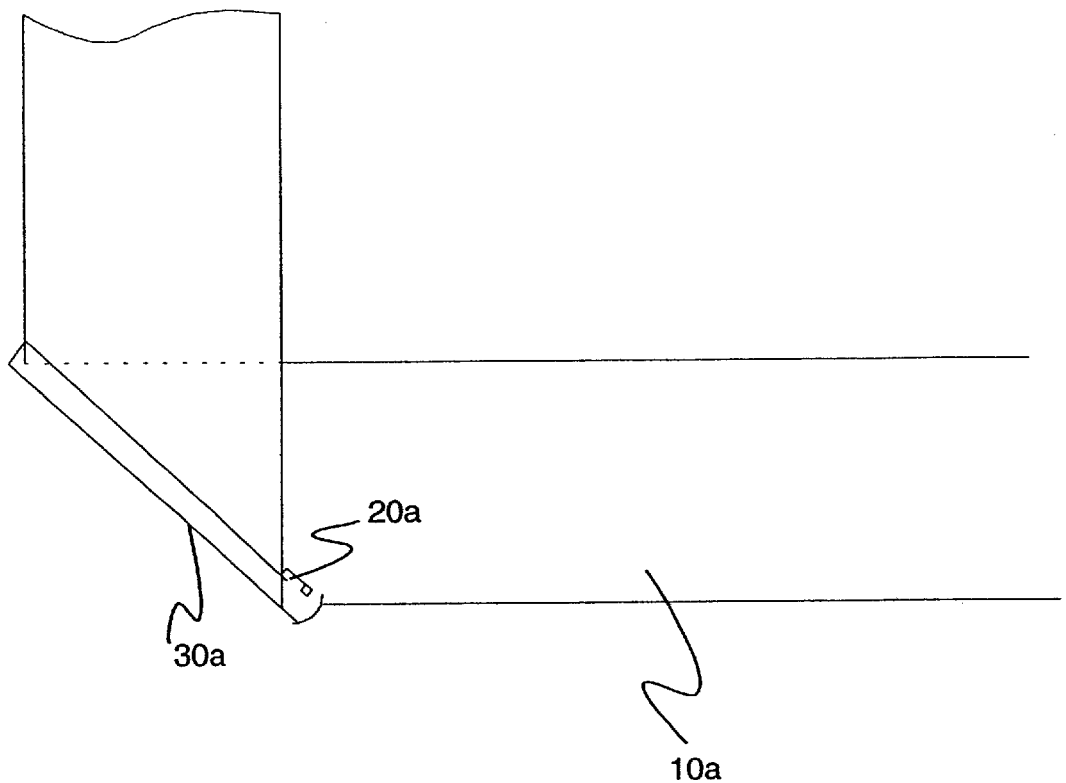
FIG. 6 is an alternate form of the cable clamp assembly of FIG. 1 for use in a ribbon cable where a bend of 45 degrees is desired.

FIG. 6 illustrates the principles of the present invention in the situation where a ribbon cable 10a is being routed through a 90 degree bend. In this embodiment, a clamp assembly consisting of an inner member 20a and an outer member 30a is mounted at a 45 degree angle with respect to the ribbon cable 10a. Since the ribbon cable 10a has a greater effective width when the members 20a, 30a are mounted at a 45 degree angle, the members 20a, 30a are longer for this embodiment than for the embodiment of FIG. 1, given a ribbon cable of the same width.

Figure 7:
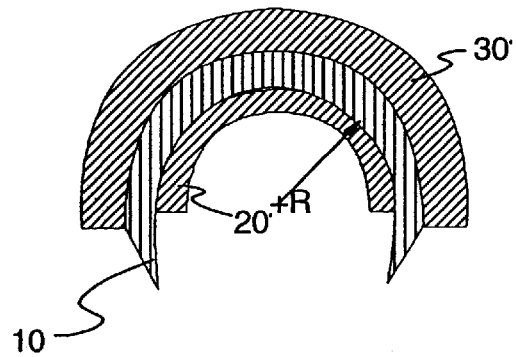
FIG. 7 is an enlarged cross sectional view of an alternate embodiment of the cable clamp assembly, taken along the line 3—3 in FIG. 2, looking in the direction of the arrows.

FIG. 7 illustrates an alternate embodiment of the present invention, where the inner member 20 and the outer member 30 are formed in a cylindrical shape, without the serpentine shape described in connection with FIG. 3. This cylindrical shape serves to captive the ribbon cable 10 between the members and provides the control on the bend to keep the bend of the ribbon cable 10 from being too great so as to damage or distort the electrical characteristics of the conductors.

Plastic is the material of choice for both the inner and outer members 20, 30, due to the lower cost of raw materials and the ease with which it can be formed into a functional unit of the desired shape and size, compared with other materials having adequate physical properties. Polycarbonate provide an excellent choice of properties and cost. The preferred material is a polycarbonate material such as is sold under the formulation of GE Cycolac VW-55, CHI MEI Polylac PA-B or Cheil Starex VE-0855, although others plastics such as nylons, polypropylenes ABS and ABS-polycarbonate blends can be successfully used, although some may require suitable modifications to the design features such as the latch. Metals, ceramics and even wood have adequate rigidity for this application but are more costly, heavier and may require a latch made of a separate part for flexibility. The preferred method of forming the inner member 20 and the outer member 30 is through injection molding in a conventional and well known manner, although other manufacturing techniques are known in the industry and could be used to advantage.

Of course, many modifications and adaptations could be made to the preferred embodiment without departing from the spirit of the present invention. In addition, some features of the present invention could be used without the corresponding use of other features. For example, the present cable clamp assembly has been described with the outer member carrying latches which are integrally formed with the member. While the preferred embodiment is seen as the best way to carry out the invention, in some instances separate latches could be used or the latches could be formed on the inner member for securing the ends of the outer member. Or the two members could be formed as a single part with a flexible hinge joining them at one end and a latch at the other. Further, the outer member could serve the function of retaining the ribbon cable and inner member in the desired position even if it were formed in a different shape. The polycarbonate material for the clamp member is also subject to design choice and other materials, especially other plastics, are believed to provided the results desired by the present invention, although factors such as cost, operating temperature, stress and strain forces to be encountered should be considered in the selection of the best material for the application. Accordingly, the foregoing description of the preferred embodiment should be considered as merely illustrative of the principles of the present invention and not in limitation thereof, since the scope of the present invention is defined by the following claims.

Having thus described the invention, what is claimed is:

1. A cable clamp assembly for securing a ribbon cable in a bent position, the cable assembly comprising:

a first member having a length which extends greater than the width of the ribbon cable and a semi-cylindrical radiused portion extending along the length of the first member, said radiused portion preventing the ribbon cable from being bent more than the radius of the member;

a second member positionable on the opposite side of the ribbon cable from the first member; and means for securing the first and second members together around the ribbon cable, said securing means including a latch carried on one of the first and second members for receiving and releasably securing opposite ends of the other of said first and second members.

2. A cable assembly of the type described in claim 1 wherein the latch projects substantially perpendicular to the length of the member on which it is mounted.

3. A cable assembly of the type described in claim 2 wherein the latch includes projections arranged on a pair of opposite ends of the member which carries it and the latch secures both the ends of the other member of the cable clamp assembly.

4. A cable assembly of the type described in claim 1 wherein the members are formed of a plastic material and the latch is formed integral with the member which carries it.

5. A cable assembly of the type described in claim 4 wherein the plastic material is polycarbonate.

6. A cable assembly of the type described in claim 5 wherein the polycarbonate material of the second member allows integral latch portions to be formed and allows the latches to be moved away from the first member to release the first member.

7. A cable clamp assembly of the type described in claim 1 wherein the first and second members each have a serpentine shape with both a convex radiused portion and a concave radiused portion and define a serpentine path there between for the ribbon cable.

8. A cable clamp assembly of the type described in claim 1 wherein the first and second members are molded together as a single piece with an integral hinge joining the first and second members.

9. A cable clamp assembly for releasably retaining a ribbon cable in a bent position with no greater bend than a minimum radius, the clamp assembly comprising:

a first elongated member positionable on the inside of the bent ribbon cable and having a semicircular section along its length, the diameter of said semicircular section being at least twice the minimum radius of the bend in the ribbon cable;

a second elongated member having a length greater than the length of the first elongated member and positioned on the outside of the bent ribbon cable, said second member including a recess of slightly greater diameter than the diameter of the first member plus twice the thickness of the ribbon cable to receive the ribbon cable and the first member, said second member including end portions which project from its length approximately the length of the first elongated member with at least one of said end portions including a movable latch element for receiving and releasably retaining the first member.

10. A cable clamp assembly of the type described in claim 9 wherein the second elongated member includes a latch at each end.

11. A cable clamp assembly of the type described in claim 9 wherein the first elongated member includes a portion for receiving and releasably retaining the latch.

12. A cable clamp assembly of the type described in claim 11 wherein the portion in the first elongated member for receiving and releasably retaining the latch is a notch slightly larger than the latch.

13. A cable clamp assembly of the type described in claim 9 wherein the second elongated member is formed as a single piece with an integral latch.

14. A cable clamp assembly of the type described in claim 13 wherein the second elongated member with the integral latch is formed of a plastic material.

15. A cable clamp assembly of the type described in claim 14 wherein the plastic material is a polycarbonate.

16. A method of securing a ribbon cable in a bent position wherein the bend formed in the ribbon cable has a limited radius to prevent damage to the cable, the steps of the method comprising:

forming a bend in the ribbon cable;

positioning a first member on the inside of the bend in the ribbon cable, said first member having a semicircular section along its length, the diameter of which is at least twice the radius to prevent the bend in the ribbon cable from being smaller than the radius;

positioning a second member on the outside of the bend of the ribbon cable; and securing the first and second members together to prevent the ribbon cable from becoming separated from the cable clamp assembly, said securing including opening a latch at an end of one of the members and inserting a portion of the other member within the latch.

17. A method of securing a ribbon cable within a cable clamp including the steps of claim 16 and further including the step of securing the one member within the other member by latches formed integrally with the one member and receiving the ends of the other member in a releasable position.

18. A method of securing a ribbon cable within a cable clamp including the steps of claim 16 wherein the first and second members each have a serpentine shape in their portions adjacent the ribbon cable and the step of forming a bend in the ribbon cable includes forming a complementary serpentine bend in the ribbon cable, whereby the ribbon cable is held between the members.

* * * * *